(12) United States Patent
Jheng-Hao

(10) Patent No.: US 11,134,437 B2
(45) Date of Patent: Sep. 28, 2021

(54) METHOD OF WIRELESS NETWORK COMMUNICATION CONNECTION

(71) Applicant: SIAOBAI INC., Taoyuan (TW)

(72) Inventor: Cyue Jheng-Hao, Taoyuan (TW)

(73) Assignee: SIAOBAI INC., Taoyuan (TW)

( * ) Notice: Subject to any disclaimer, the term of this patent is extended or adjusted under 35 U.S.C. 154(b) by 0 days.

(21) Appl. No.: 16/502,526

(22) Filed: Jul. 3, 2019

(65) Prior Publication Data

US 2020/0015160 A1    Jan. 9, 2020

(30) Foreign Application Priority Data

Jul. 6, 2018 (TW) .................. 107123396

(51) Int. Cl.
*H04W 24/10* (2009.01)
*H04W 8/26* (2009.01)
*H04W 8/00* (2009.01)
*H04W 92/20* (2009.01)
*H04W 92/12* (2009.01)
*H04W 48/20* (2009.01)
*H04W 76/11* (2018.01)
*H04W 48/16* (2009.01)
*H04W 72/08* (2009.01)

(52) U.S. Cl.
CPC .......... *H04W 48/20* (2013.01); *H04W 8/005* (2013.01); *H04W 8/26* (2013.01); *H04W 24/10* (2013.01); *H04W 48/16* (2013.01); *H04W 72/085* (2013.01); *H04W 76/11* (2018.02); *H04W 92/12* (2013.01); *H04W 92/20* (2013.01)

(58) Field of Classification Search
CPC ..... H04W 48/20; H04W 48/16; H04W 8/005; H04W 72/085; H04L 67/42; H04L 67/10
See application file for complete search history.

(56) References Cited

U.S. PATENT DOCUMENTS

| | | | |
|---|---|---|---|
| 2017/0086124 A1* | 3/2017 | Chueh | H04W 40/246 |
| 2018/0201474 A1* | 7/2018 | Noxon | H04W 8/005 |
| 2019/0081664 A1* | 3/2019 | Vermani | H04B 7/0456 |

* cited by examiner

*Primary Examiner* — Iqbal Zaidi
(74) *Attorney, Agent, or Firm* — Thomas | Horstemeyer, LLP

(57) ABSTRACT

The present innovation patent relates to a wireless network communication connection method that is applied to a wireless network, the wireless network including a master controller, a first access point, a second access point, and a third access point. After the second access point has been connected with the master controller and the device list of the second access point is not provided with the UUID of the third access point, the third access point is able to deliver the UUID of the third access point to the second access point through the master controller, so that the second access point can scan again after receiving the UUID of the third access point, and can reselect a next desired connection point according to the device list of its determining condition. It is provided for determining connection quality and selecting the better and the practicality will be enhanced thereby.

13 Claims, 5 Drawing Sheets

METHOD OF WIRELESS NETWORK COMMUNICATION CONNECTION

BACKGROUND OF THE INNOVATION PATENT

1. Field of the Innovation Patent

The present innovation patent relates to a wireless network communication connection method, particularly is executed in wireless network which is able to determine connection quality and select the better one, and is applied to wireless network communication or similar system.

2. The Related Arts

Currently, most of the wireless network are connected to the network through a wireless router. Some users who want to extend the coverage of wireless network will buy a wireless accessor point or a wireless repeater to extend, but, usually, users are required of authorization to login to connect to the Internet through wireless network. Hence, once users are away from the original access point or the repeater, the wireless device will be disconnected and can not be connected to the network. Even though there are other access points or repeaters nearby, the wireless device will not be connected automatically. Because the wireless devices of the users are not authenticated by a new access point or a repeater, the wireless device of the users will not be connected to the new repeater automatically. Only if the user manually enters universally unique identifier (UUID) and password of the new repeater on his/her own wireless device, the new repeater then will allow the wireless device to upload the uplink to connect to the network.

Moreover, the user's wireless device is designed to keep connecting as much as possible. Therefore, although the quality of wireless connection with an access point or a repeater is very poor, the user's wireless device keeps connecting as much as possible as long as the connection is still available. It resulted that even there are other available (have been authenticated) and quality-better access points and repeaters existing, but the user's wireless device still will not switch because the connection in use does not have no signal at all.

SUMMARY OF THE INNOVATION PATENT

Hence, an embodiment of the present invention provides a wireless network communication connection method is applied to wireless network, the wireless network including a master controller, a first access point, a second access point, and a third access point. After the second access point has been connected with the master controller and the device list of the second access point is not provided with the UUID of the third access point, the third access point is able to deliver the UUID of the third access point to the second access point through the master controller, so that the second access point can scan again after receives the UUID of the third access point, and can reselect a next desired connection point according to the device list of its determining condition. It is provided for determining connection quality and selecting the better and the practicality will be enhanced thereby.

Another object of the present innovation patent is to provide a wireless network communication connection method. After the second access point scans again, the determining condition of the device list of the step of reselecting a next desired connection point according to the determining condition of the device list thereof is set with a first condition which is cable connected, a second condition which is whether the wireless is connected, and a third condition which is connection distance and connection speed, so as to provide function of determining the uplink by priority order to optimize connection state, and the practicality will be enhanced thereby.

DETAILED DESCRIPTION OF PREFERRED EMBODIMENT

Figure 1:
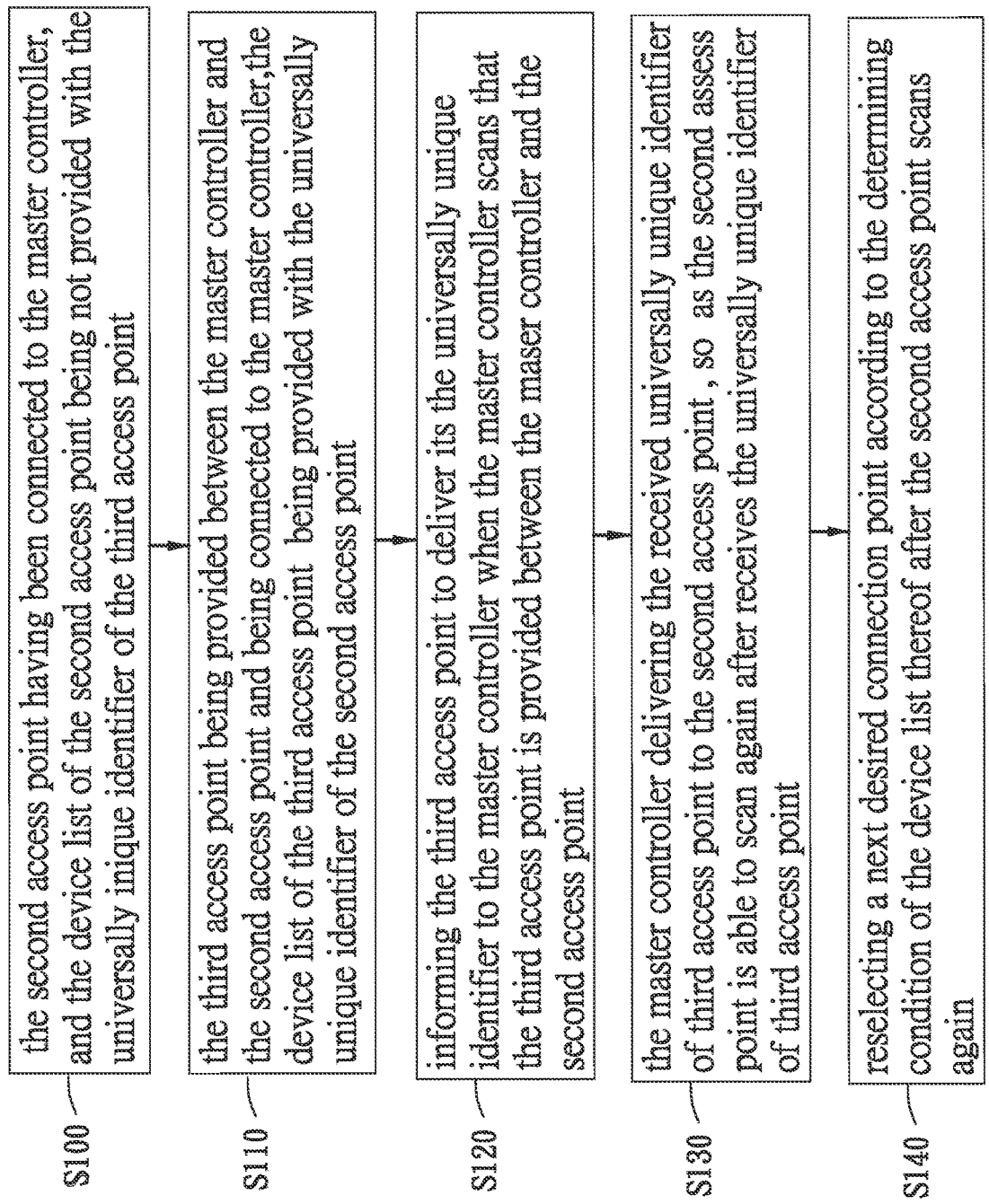
FIG. 1 shows a flow diagram of the main steps of the present invention.
Figure 2:
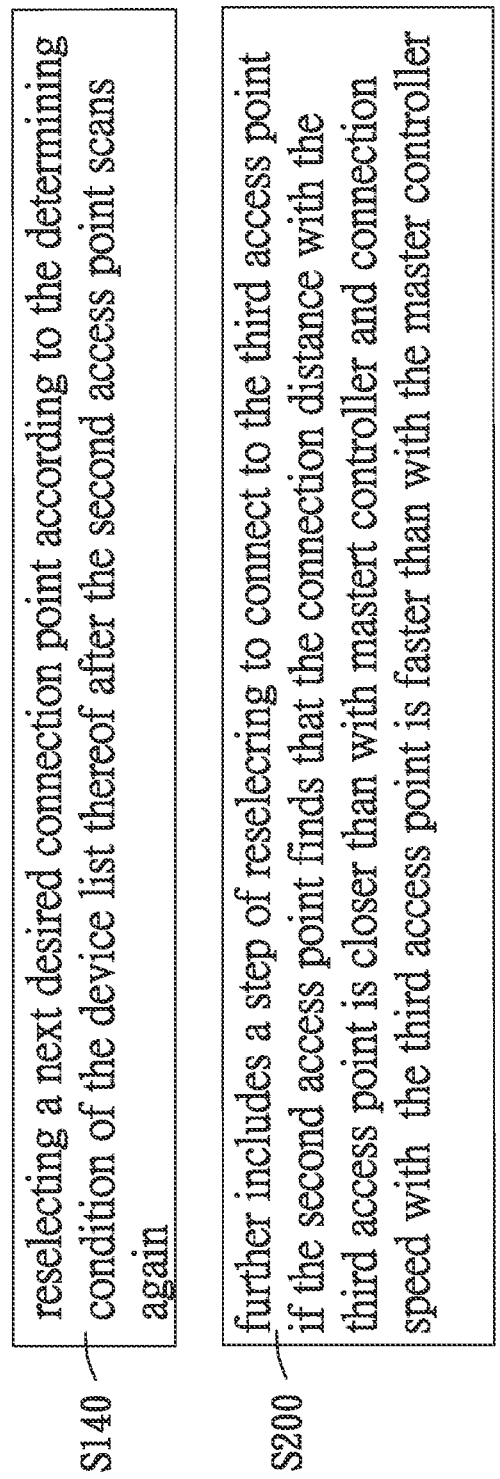
FIG. 2 shows a flow diagram of the step of reselecting to connect to the third access point of the present invention.
Figure 3:
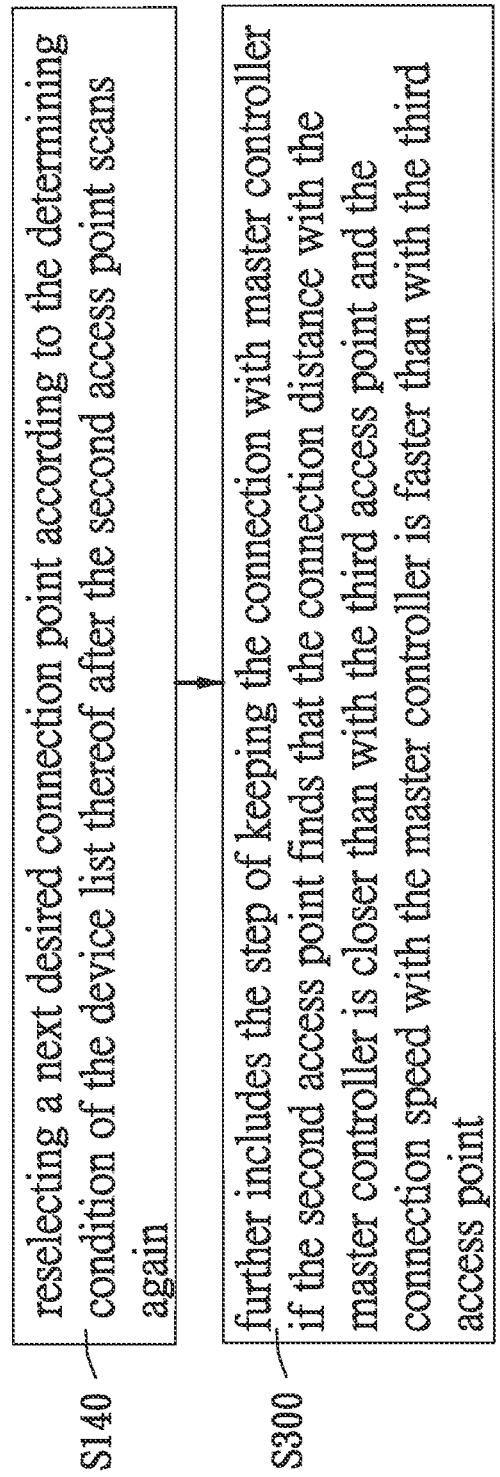
FIG. 3 shows a flow diagram of the step of keeping connection with the master controller of the present invention.
Figure 4:
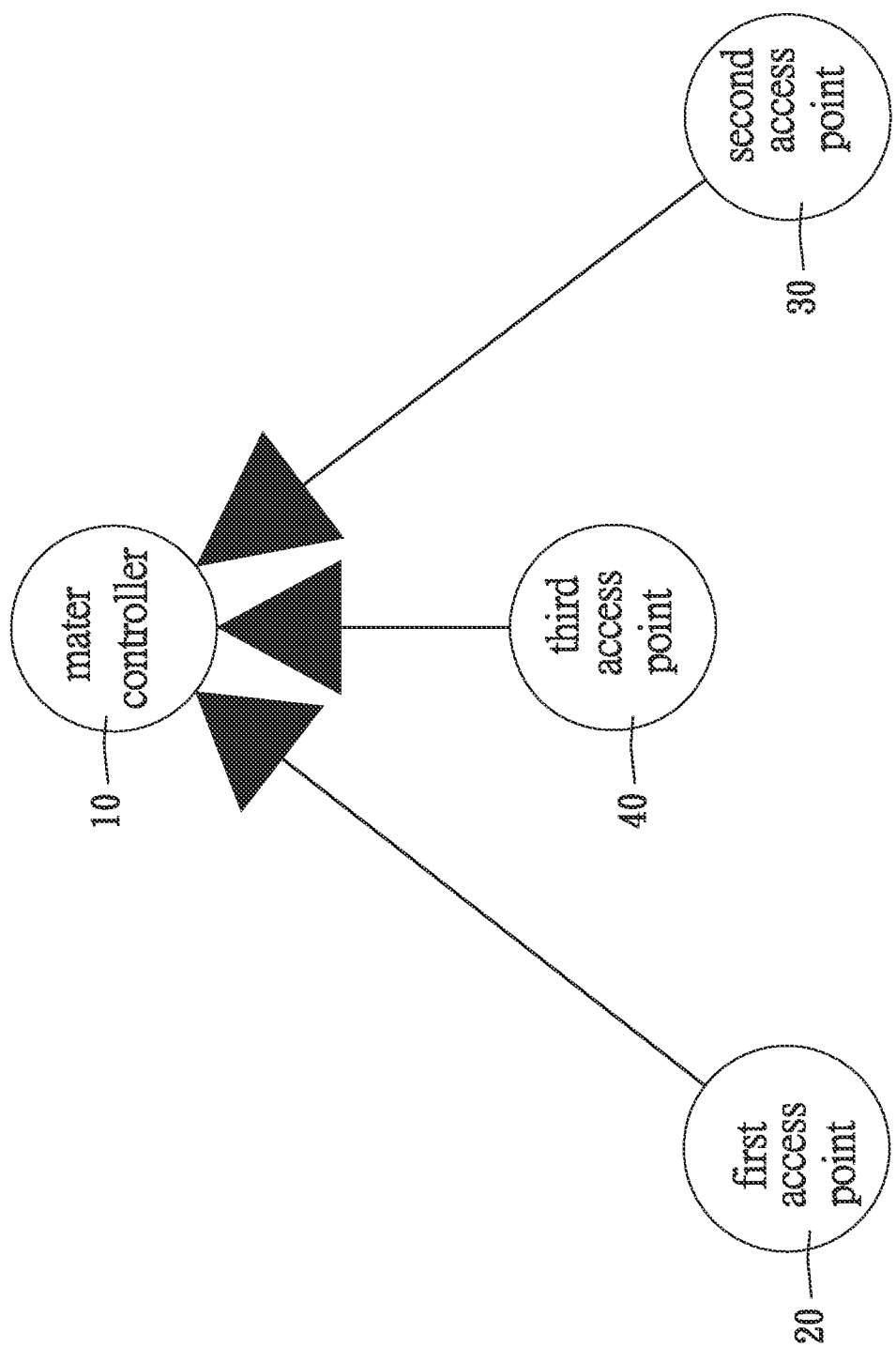
FIG. 4 shows a structure diagram of the connection of the second access point and the controller master of the present invention.
Figure 5:
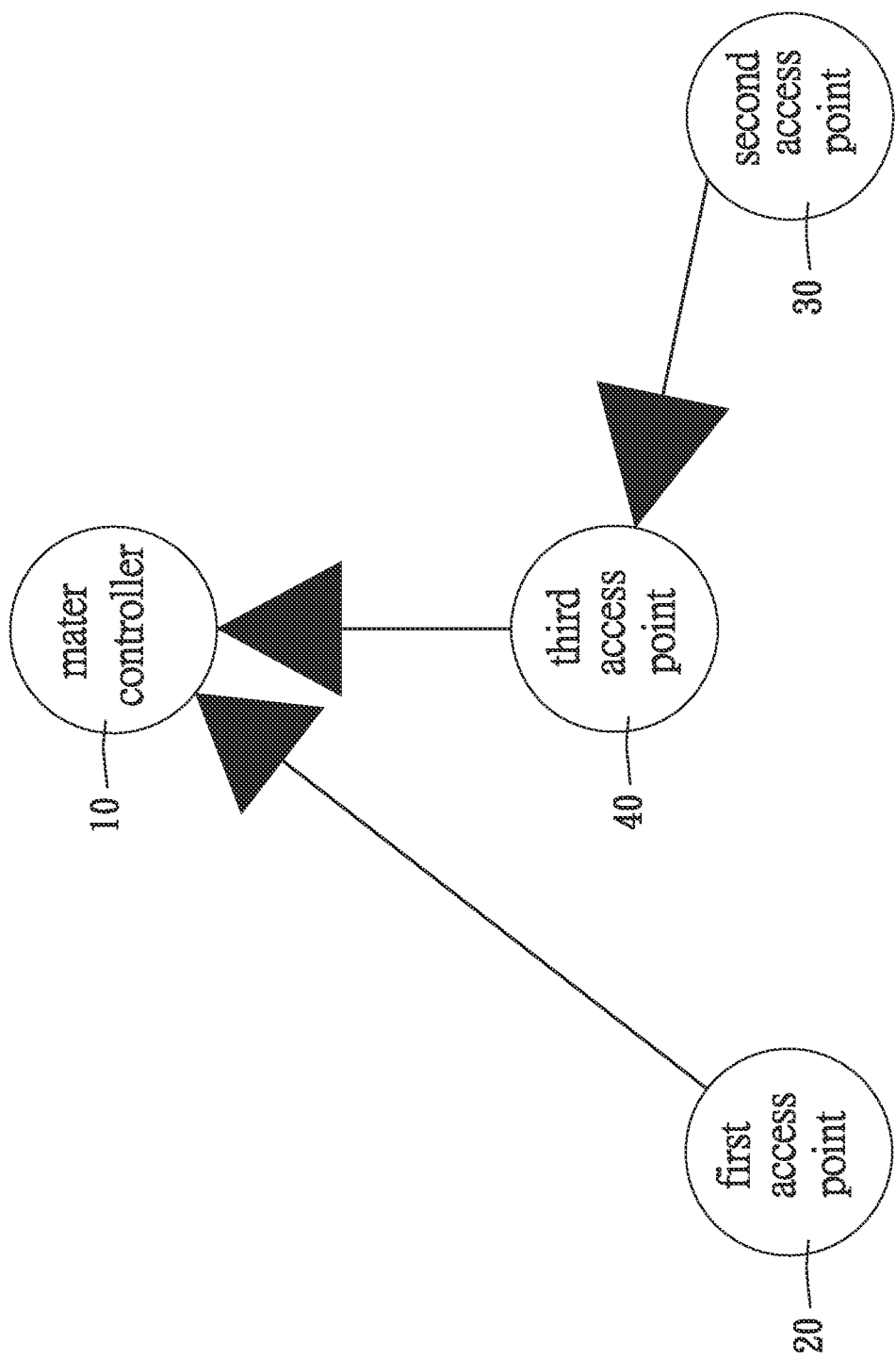
FIG. 5 shows a structure diagram of the connection of the second access point and the third access point of the present invention.

With reference to FIG. 1 to FIG. 5, the figures show schematic diagram of an embodiment of the present invention. A wireless network communication connection method of the best embodiment is applied to the connection quality of the wireless network to improve the problem of quality of the current wireless network connection, so as to provide function of determining the uplink by priority order to optimize connection state.

The wireless network communication connection method of the present invention is applied to wireless network. The wireless network includes a master controller 10, a first access point 20, a second access point 30, and a third access point 40. The first access point 20 is connected to the master controller 10. The master controller 10 is an equipment with network function, and the equipment is selected from a computer with wireless function, a mobile equipment, a wireless router, an access point, a repeater, an extender or a wireless client. The first access point 20, the second point 30, and the third access point 40 are equipment with network function, and the equipment is selected from a computer with wireless function, a mobile equipment, a wireless router, an access point, a repeater, an extender or a wireless client. The above-mentioned wireless client is one, having Wi-Fi module, which is selected from a personal computer with wireless function, thin client, tablet computer, a note book, a mobile phone, a personal digital assistant.

First step S100 is that the second access point 30 has been connected to the master controller 10, and the device list of the second access point 30 is not provided with the universally unique identifier (UUID) of the third access point 40. When the first access point 20 and the master controller 10 is connected, the second access point 30 and the maser controller 10 have been connected, and the device list of the second access point 30 is not provide with the UUID of the third access point 40, and then the first access point 20 and the second access point 30 select a connection to the master controller 10 according to the determining condition of the device list thereof. The determining condition of the device list of the first access point 20 and the device list of the second access point 30 is set with a first condition which is cable connected, and a second condition which is whether the wireless is connected, and a third condition which is connection distance and connection speed. But the primary condition is that the device list must be provide with the UUID of the access point that is desired to connect, otherwise will only be connected to the access point whose device list saves the UUID. After the step S100, the next step is a step S110.

Further, the next is the step S110 that the third access point 40 is provided between the master controller 10 and the second access point 30 and is connected to the master controller 10, and the device list of the third access point 40 is provided with the universally unique identifier of the second access point 30. When the third access point 40 is provided between the master controller 10 and the second access point 30, the device list of the third access point 40 is provided with the UUID of the second access point 30. Therefore, the device list of the third access point 40 is able to determine the connection effect of which of access point of the master controller 10 or the second access point 30 can be provided with the optimal state according to the determining condition, and is uplinked to the access point. Hence, when the determining condition of the device list of the third access point 40 determines that connecting to the master controller 40 is optimal state, the master controller 40 will be selected to connect. After the step S110, the next step is step S120.

Further, the next is the step S120 of informing the third access point 40 to deliver its the universally unique identifier to the master controller 10 when the master controller 10 scans that the third access point 40 is provided between the master controller 10 and the second access point 30. When the third access point 40 is connected to the master controller 10, and the master controller 10 finds that the third access point 40 is provided between the master controller 10 and the second access point 30, but the second access point 30 does not select to connect the closer third access point 40, and thus the master controller 10 informs the third access point 40 to deliver its UUID to the master controller 10, so that the device list of the master controller 10 has the UUID of the third access point 40. After the step S120, the next is a step S130.

Further, the next step is the step S130 that the master controller 10 delivers the received universally unique identifier of third access point 40 to the second access point 30, so as that the second access point 30 is able to scan again after receives the universally unique identifier of third access point 40. After the master controller 10 receives the UUID of the third access point 40, delivers the UUID of the third access point 40 to the second access point 30, so that the second access point 30 is able to receive the UUID of the third access point 40 to recognize the connection point of the third access point 40. The second access point 30 can scan again after receives the UUID of the third access point 40, so as to find the connection point of the third access point 40. After the step S130, the next is a step S140.

Further, the next step is the step S140 of reselecting a next desired connection point according to the determining condition of the device list thereof after the second access point 30 scans again. After the second access point 30 scans again and finds the third access point 40, the second access point 30 reselects a next desired connection point according to the determining condition of the device list thereof. The determining condition of the device list is set with a first condition which is cable connected, a second condition which is whether the wireless is connected, and a third condition which is connection distance and connection speed, so as to determine connection quality and select the better one.

After the step S140, the second access point 30 is provide with two options. The first one is after the step S140 of reselecting a next desired connection point according to the determining condition of the device list thereof after the second access point 30 scans again, a further step is a step S200 of reselecting to connect to the third access point 40, if the second access point 30 finds that the connection distance with the third access point 40 is closer than with the master controller 10 and the connection speed with the third access point 40 is faster than with the master controller 10. That is after the second access point 30 scans and finds the third access point 40, evaluates according to the determining condition of its device list, and when the second access point 30 finds that the connection distance with the third access point 40 is closer than with the master controller 10 and the connection speed with the third access point 40 is faster than the master controller 10, then will disconnect with the master controller 10 and reselect to connect to the third access point 40.

After the step S140 of reselecting a next desired connection point according to the determining condition of the device list thereof after the second access point 30 scans again, another step is a step S300 of keeping the connection with master controller 10 if the second access point 30 finds that the connection distance with the master controller 10 is closer than with the third access point 40 and the connection speed with the master controller 10 is faster than with the third access point 40. That is after the second access point 30 scans and finds the third access point 40, evaluates according to the determining condition of its device list. When the second access point 30 finds that the connection distance with the master controller 10 is closer than with the third access point 40 and the connection speed with the master controller 10 is faster than with the third access point 40, the second access point 30 will keep the connection with the master controller 10.

However, the above description should be considered as only the discussion of the preferred embodiments of the present innovation patent, and the claims of the present innovation patent is not limited to this. A person skilled in the art may make various modifications to the present innovation patent. Those modifications still fall within the spirit and scope defined by the appended claims.

What is claimed is:

1. A wireless network communication connection method applied to wireless network, comprising:
providing the wireless network, the wireless network comprising a master controller, a first access point, a second access point, and a third access point, the first access point being connected to the master controller, the second access point having been connected to the master controller, and the device list of the second access point not being provided with a universally unique identifier of the third access point, the third access point being provided between the master controller and the second access point and being connected to the master controller, and the device list of the third access point being provided with a universally unique identifier of the second access point;
informing the third access point to deliver the universally unique identifier of the third access point to the master controller when the master controller scans and detects that the third access point is provided between the master controller and the second access point;

delivering, by the master controller, the universally unique identifier of the third access point as received to the second access point such that the second access point is able to scan again after receipt of the universally unique identifier of the third access point;

reselecting a next desired connection point according to a determining condition of the device list thereof after the second access point scans again; and reselecting to connect to the third access point in response to the second access point finding that the connection distance with the third access point is closer than with the master controller, and the connection speed with the third access point is faster than with the master controller.

2. The wireless network communication connection method according to claim 1, wherein the determining condition of the device list thereof after the second access point scans again is further set with a first condition which is a cable connected, a second condition which is whether the wireless is connected, and a third condition which is a connection distance and connection speed.

3. The wireless network communication connection method according to claim 1, wherein reselecting the next desired connection point according to the determining condition of the device list thereof after the second access point scans again, further comprises keeping the connection with the master controller when the second access point finds that the connection distance with the master controller is closer than with the third access point, and the connection speed with the master controller is faster than with the third access point.

4. The wireless network communication connection method according to claim 1, wherein the master controller further is an equipment with network functionality, and the equipment is a computer with wireless functionality, a mobile equipment, a wireless router, an access point, a repeater, an extender or a wireless client.

5. The wireless network communication connection method according to claim 1, wherein the first access point, the second access point, and the third access point further are equipment with network functionality, and the equipment comprises at least one of a computer with wireless functionality, a mobile equipment, a wireless router, an access point, a repeater, an extender, or a wireless client.

6. A wireless network communication connection method applied to a wireless network, comprising:
providing the wireless network, the wireless network comprising a master controller, a first access point, a second access point, and a third access point, the first access point being connected to the master controller, the second access point having been connected to the master controller, the device list of the second access point being not provided with the universally unique identifier of the third access point, the third access point being provided between the master controller and the second access point and being connected to the master controller, the device list of the third access point being provided with the universally unique identifier of the second access point;

informing the third access point to deliver its the universally unique identifier to the master controller when the master controller scans that the third access point is provided between the master controller and the second access point;

delivering, by the master controller, the received universally unique identifier of third access point to the second access point such that the second access point is able to scan again after receiving the universally unique identifier of third access point;

reselecting a next desired connection point according to a determining condition of the device list thereof after the second access point scans again; and keeping the connection with master controller when the second access point finds that the connection distance with the master controller is closer than with the third access point, and the connection speed with the master controller is faster than with the third access point.

7. The wireless network communication connection method according to claim 6, wherein the determining condition of the device list thereof after the second access point scans again is further set with a first condition which is a cable connected, a second condition which is whether the wireless is connected, and a third condition which is a connection distance and connection speed.

8. The wireless network communication connection method according to claim 6, wherein the master controller further is an equipment with network functionality, and the equipment is selected from a computer with wireless functionality, a mobile equipment, a wireless router, an access point, a repeater, an extender, or a wireless client.

9. The wireless network communication connection method according to claim 6, wherein the first access point, the second point, and the third access point further are equipment with network functionality, and the equipment comprises at least one of a computer with wireless functionality, a mobile equipment, a wireless router, an access point, a repeater, an extender, or a wireless client.

10. A wireless network communication connection method applied to wireless network, comprising:
providing the wireless network, the wireless network comprising a master controller, a first access point, a second access point, and a third access point, the first access point being connected to the master controller, the second access point being connected to the master controller, and the device list of the second access point not being provided with a universally unique identifier of the third access point, the third access point being provided between the master controller and the second access point and being connected to the master controller, and the device list of the third access point being provided with a universally unique identifier of the second access point;

informing the third access point to deliver the universally unique identifier of the third access point to the master controller when the master controller scans and detects that the third access point is provided between the master controller and the second access point;

delivering, by the master controller, the universally unique identifier of the third access point as received to the second access point such that the second access point is able to scan again after receipt of the universally unique identifier of the third access point; and reselecting a next desired connection point according to a determining condition of the device list thereof after the second access point scans again, wherein the determining condition of the device list thereof after the second access point scans again is further set with a first condition which is a cable connected, a second condition which is whether the wireless is connected, and a third condition which is a connection distance and connection speed.

11. The wireless network communication connection method according to claim 10, wherein reselecting the next desired connection point according to the determining condition of the device list thereof after the second access point scans again, further comprises:

reselecting to connect to the third access point when the second access point determines that the connection distance with the third access point is closer than with the master controller, and the connection speed with the third access point is faster than with the master controller.

12. The wireless network communication connection method according to claim 10, wherein the master controller further is an equipment with network functionality, and the equipment is selected from a computer with wireless functionality, a mobile equipment, a wireless router, an access point, a repeater, an extender, or a wireless client.

13. The wireless network communication connection method according to claim 10, wherein the first access point, the second point, and the third access point further are equipment with network functionality, and the equipment comprises at least one of a computer with wireless functionality, a mobile equipment, a wireless router, an access point, a repeater, an extender, or a wireless client.

* * * * *